(12) United States Patent
Pettifor et al.

(10) Patent No.: US 7,095,837 B1
(45) Date of Patent: Aug. 22, 2006

(54) INTELLIGENT NETWORK SERVICES

(75) Inventors: James Douglas Pettifor, Suffolk (GB); Alan James Clapton, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/743,702

(22) PCT Filed: Jul. 30, 1999

(86) PCT No.: PCT/GB99/02492

§ 371 (c)(1),
(2), (4) Date: Jan. 16, 2001

(87) PCT Pub. No.: WO00/10341

PCT Pub. Date: Feb. 24, 2000

(30) Foreign Application Priority Data

Aug. 14, 1998 (EP) .................................. 98306520

(51) Int. Cl.
H04M 3/42 (2006.01)

(52) U.S. Cl. ............. 379/207.02; 379/200; 379/114.14

(58) Field of Classification Search ........... 379/114.01, 379/200, 201.01, 114.14, 207.02
See application file for complete search history.

(56) References Cited

U.S. PATENT DOCUMENTS

| | | | | | |
|---|---|---|---|---|---|
| 5,200,995 | A | * | 4/1993 | Gaukel et al. ............... | 379/200 |
| 5,694,461 | A | * | 12/1997 | Lee ............................ | 379/196 |
| 5,729,598 | A | * | 3/1998 | Kay ...................... | 379/114.29 |
| 5,774,530 | A | * | 6/1998 | Montgomery et al. . | 379/112.01 |
| 6,014,435 | A | * | 1/2000 | Rosen ......................... | 379/200 |
| 6,311,055 | B1 | * | 10/2001 | Boltz ....................... | 455/414.1 |
| 6,687,353 | B1 | * | 2/2004 | Brysch et al. .............. | 379/189 |

* cited by examiner

*Primary Examiner*—Rasha S. Al-Aubaidi
(74) *Attorney, Agent, or Firm*—Nixon & Vanderhye P.C.

(57) ABSTRACT

In a telephone network, a service control point is called by a switching center, if a flag has previously been set by some event (e.g. call charges crossing a threshold or the leaving of a voice mail message) when a call is being established or terminated. The switching center then operates in accordance with commands returned by the service control point. If no flags have been set, the service control point is not called and the call is treated by the switching center in a default manner.

12 Claims, 3 Drawing Sheets

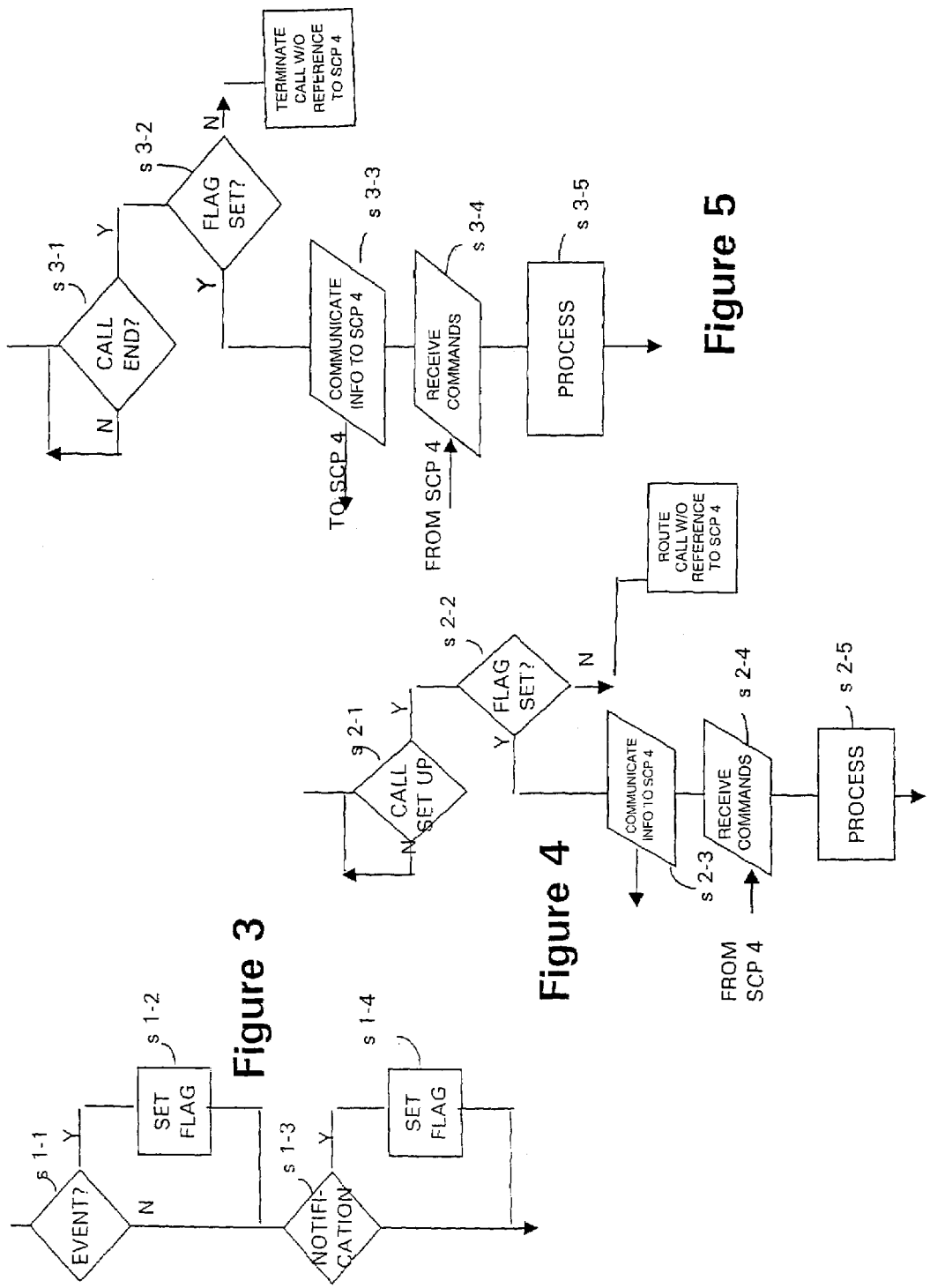

INTELLIGENT NETWORK SERVICES

BACKGROUND

1. Field of Invention

The present invention relates to a telephone network and a method of call processing in a telephone network.

In the present application, "enhanced service" means any service provided to a subscriber other than simple connection made, in response to dialling by a caller, between the terminal equipment from which the caller attempts to establish the call and another, "target", terminal equipment to which the attempt is made, and the associated signalling of ringing, engaged status and number unobtainable. The enhanced service may be provided to either the subscriber making the call attempt (for example call barring) or to the subscriber at the target terminal equipment (for example voice mail).

2. Description of Related Art

It is known to provide such enhanced services, sometimes known as "intelligent network" services, in telephone networks. The processing required to implement such services can be carried out by a telephone switching centre. However, this has been found to be undesirable because telephone switching equipment manufacturers must customise their switches according to different network operators' requirements. This increases the cost of such equipment.

An alternative approach is to use a relatively simple switching centre in conjunction with an enhanced service processing apparatus, or "service control point". In this arrangement, the switching centre notifies the enhanced service processing apparatus of an attempt to establish a call connection and the enhanced service processing apparatus returns switching control commands such as "proceed as normal" or "bar call".

A third approach, exemplified in International Patent Specifications WO97/48238 and WO96/13949 also use an enhanced service processing apparatus, but this is invoked only if the switching centre identifies the call as being of a type which may require enhanced processing, either because the digits dialled identify a target party for which enhanced processing capability is required, or because such capability has been previously specified for the calling party.

A disadvantage with these approaches is that there is often a lot of traffic between the switching centres and the enhanced service processing apparatus consisting of notifications of call connection establishment attempts and "proceed as normal" commands, for example, if the conditions for call forwarding are not met (line not busy, wrong time of day, etc). This extra traffic, and the extra processing carried out by the enhanced service processing apparatus, can impede the efficient operation of the enhanced services processes. It is an aim of the present invention to solve or ameliorate the aforementioned problem.

BRIEF SUMMARY

According to the present invention, there is provided a telephone network comprising a telephone switching centre coupled to a subscriber line and being responsive to an attempt to establish or terminate a call connection via the subscriber line to selectively either notify an enhanced service processing apparatus of that attempt, or establish or terminate said call connection without such notification; said selection being based on the previous occurrence of a predetermined event associated with the subscriber line, the enhanced service processing apparatus being responsive to such notification to send switching control commands to the telephone switching centre. As a consequence, traffic between the switching centre and the enhanced services processing apparatus only occurs when there is at least the possibility of a switching control command other than "proceed as normal".

Preferably, the switching centre includes processing means including flag means, the processing means being responsive to notification of said predetermined event to change the state of said flag means and, in the event of an attempt to establish or terminate a call connection via said subscriber line, to determine, in dependence on the state of the flag means, whether to notify the enhanced service processing apparatus of the attempt. The switching centre therefore merely requires a flag to be set for each subscriber line to indicate whether the switch should currently invoke the enhanced services processing apparatus. The flags are controlled by the service processing apparatus, in response to requests from the user, or other events. The switch itself carries out no processing of the enhanced service, other than to determine from the flag setting whether the enhanced services processing apparatus is required.

Preferably, event-detecting means is included for detecting a predetermined event and notifying the switching centre of an occurrence of said event.

Preferably, the processing means includes a plurality of flag means associated with respective predetermined events, the processing means being responsive to notification of one of said predetermined events to change the state of the associated flag means and, in the event of an attempt to establish or terminate a call connection via said subscriber line to select, in dependence on the states of the flag means together with the flag means state information, whether to notify the enhanced service processing apparatus of the attempt, and to perform such notification if so selected. More preferably, the enhanced service processing apparatus generates said switching control commands in dependence on said flag state information.

The event detecting means may comprise a voice mail system, in which case the event or one of the events comprises storing of voice mail for the subscriber of said subscriber line. The event detecting means may comprise a call charging system, in which case the event or one of the events comprises the accumulated call charges for the subscriber of said subscriber line exceeding a threshold value.

According to the present invention, there is also provided a method of processing calls in a telephone network comprising:— recording the occurrences of one or more predetermined events at a telephone switching centre, said events being associated with a subscriber line connected to the switching centre;

detecting attempts to establish or terminate calls via the subscriber line;

determining whether a record of the occurrence of one or more of said predetermined events exists at the switching centre; and if it is determined that a record of the occurrence of one or more of said predetermined events exists at the switching centre:— notifying an enhanced service processing apparatus of the attempt;

generating switching control commands at the enhanced service processing apparatus; and communicating said commands to the switching centre to control the establishment or termination of said call; but if it is determined that no record of the occurrence of one or more of said predetermined events currently exists at the switching centre:— establishing or terminating the call using only the switching functions of the switching centre.

The event may comprise, for example, storing of voice mail, or exceeding of a threshold value by a cumulative parameter relating to usage of the telephone system, such as call charges accumulated on the user's account. Other events, such as accessing the voice mail or replenishing the funds in a user account, may cause such records to be erased, such that the enhanced service processing apparatus is not then notified of further call attempts until a further occurrence of the predetermined event.

BRIEF DESCRIPTION OF THE DRAWINGS

An embodiment of the present invention will now be described, by way of example, with reference to the accompanying drawings, in which:—

FIGS. 3, 4 and 5 are flow diagrams illustrating the operation of the system of FIG. 1.

DETAILED DESCRIPTION OF EXEMPLARY EMBODIMENTS

Figure 1:
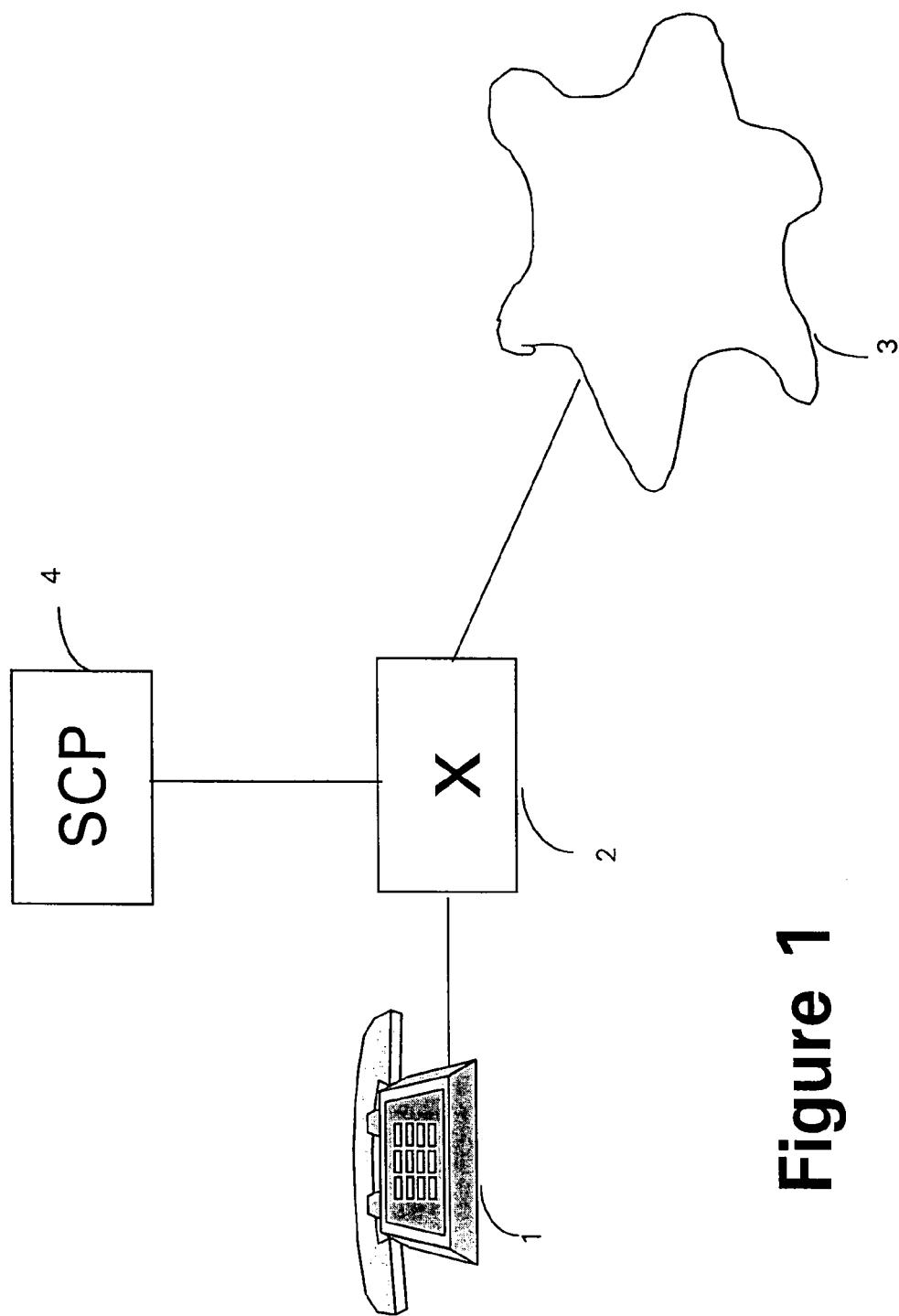
FIG. 1 illustrates part of a telephone system.

Referring to FIG. 1, a telephone system comprises a terminal equipment 1, for instance a telephone set, connected by a telephone line to a switching centre 2. The switching centre is connected to the rest of the Public Switched Telephone Network 3 and also to a service control point 4. The service control point 4 provides instructions to the switching centre 2 for the provision of enhanced services.

Figure 2:
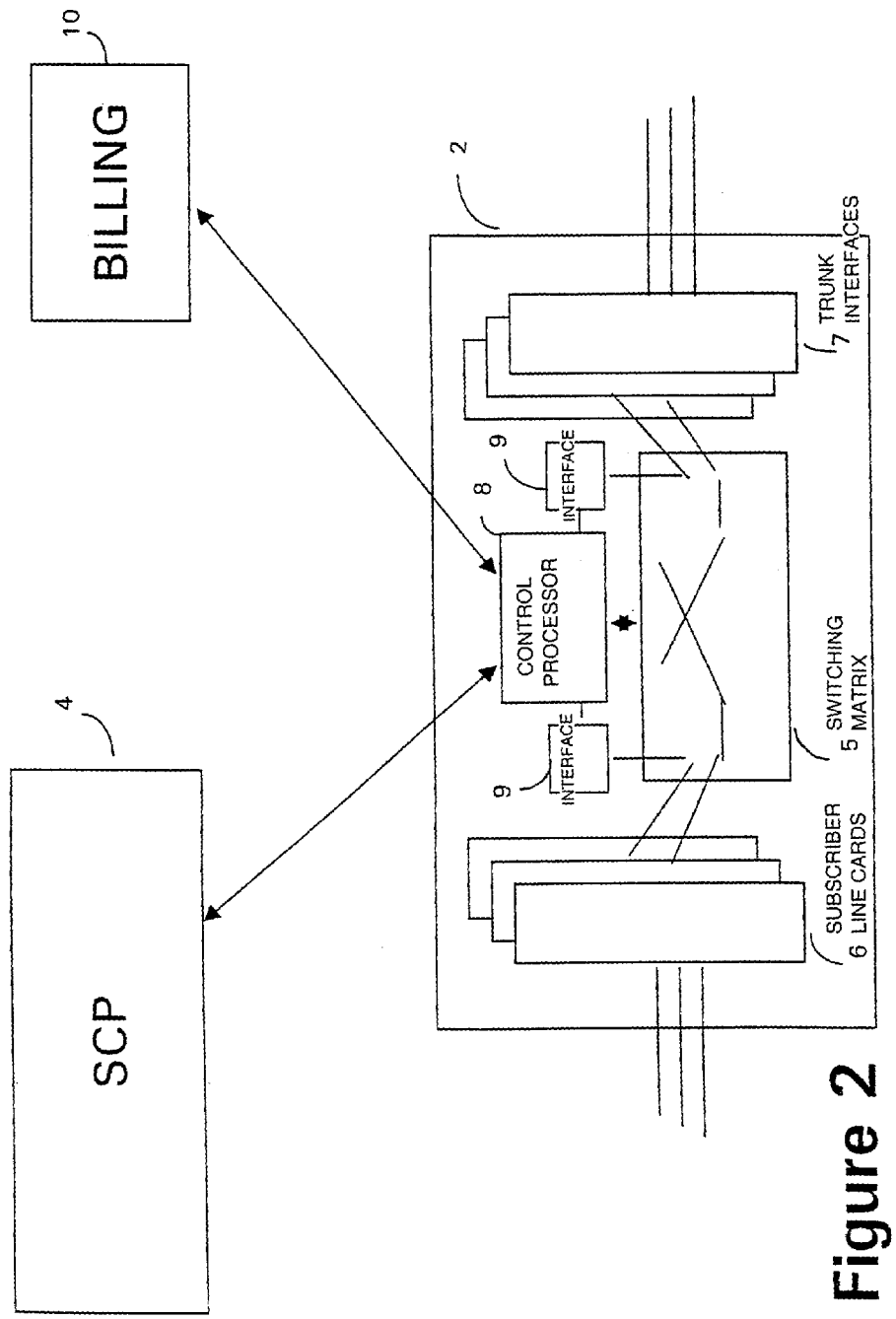
FIG. 2 illustrates switching centre of the telephone system of FIG. 1.

Referring to FIG. 2, the switching centre comprises a digital switching matrix 5, a plurality of subscriber line cards 6 connected to the switching matrix 5, a plurality of trunk interfaces 7 also connected to the switching matrix 5, a control processor 8 and a plurality of signalling interfaces 9, some of which are coupled to subscriber lines and some of which are connected to trunks. The control processor the 8 controls the operation of the digital switching matrix 5 in response to signalling data from the signalling interfaces 9 and switching control commands from the service control point 4. The control processor 8 also receives data from and sends data to a call charging subsystem 10.

The operation of the exemplary embodiment of FIGS. 1 and 2 will now be described with reference to FIGS. 3, 4 and 5.

It is known for a calling party to be offered the opportunity of leaving a voice mail message in the event that the called party does not answer the call. This known process differs in a system according to the present invention in that an "end of call-voice mail" flag, or trigger, is set in the control processor 8 when voice mail is left.

When the called party subsequently makes a call and that call terminates, the control processor 8 notes that the "end of call-voice mail" flag is set and calls the service control point 4, sending the identity of the flag and the identity of the subscriber. The service control point 4 responds by returning switching control commands to the control processor 8 of switching centre 2 to cause it to connect the subscriber to a voice mail centre so that he can listen to his voice mail.

Another function provided by the present embodiment is call barring in the event of call charges reaching a limit value. In order to provide this function, the control processor 8 implements an "start of call—excess charge" flag. Normally, this flag is set to false. Accordingly, when the subscriber makes a call, the call is routed by the switch centre 2 without reference to the service control point 4. However, if the cost of the subscriber's calls exceed a threshold value, the call charging sub-system 10 notifies the switching centre 2 which then sets the "start of call—excess charge" flag. Consequently, when the subscriber now attempts to make a call, the control processor 8 detects that the call is being made and that the "start of call—excess charge" flag is set, and notifies the service control point 4. The service control point 4 then returns call barring commands to the control processor 8 of the switching centre 2. The control processor 8 responds by controlling to switching matrix 5 so as to bar the subscriber's call.

Referring to FIGS. 3, 4 and 5, it will be appreciated that the operation of a system according to the present invention may be generalised as follows.

A first process of the control processor 8, shown in FIG. 3, monitors the signalling interfaces 9 for predetermined events (step s1-1) and, if one of the predetermined events is detected, it causes a flag setting to be changed (step s1-2). In the same process, the control processor 8 checks for incoming notification signals from other system control and administration components, e.g. a call charging sub-system, (step s1-3) and, if such signals are received, sets corresponding flags (step s1-4).

A second process of the control processor 8, shown in FIG. 4, comprises determining that a party is attempting to set up call (step s2-1) and determining whether any relevant flags, i.e. flags associated with one or other of the would-be parties to the call, are set (step s2-2). If a flag is set, the control processor 8 communicates this information to the service control point 4 (step s2-3) together with the identity of the party to which the flag relates. The control processor 8 then receives switching control commands back from the service control point 4 (step s2-4) and implements them (step s2-5). If no flags are set, the call is routed without reference to the service control point 4.

A third process of the control processor 8, shown in FIG. 5, comprises determining that a call is being terminated (step s3-1) and determining whether any relevant flags, i.e. flags associated with one or other of the parties to the call, are set (step s3-2). If a flag is set, the control processor 8 communicates this information to the service control point 4 (step s3-3) together with the identity of the party to which the flag relates. The control processor 8 then receives switching control commands back from the service control point 4 (step s3-4) and implements them (step s3-5). If no flags are set, the call terminates in the normal manner with no reference being made to the service control point 4.

If will be appreciated that flags associated with many different events may be implemented and that the present invention is not limited to the illustrative examples described above.

What is claimed is:

1. A telephone network comprising a switching center coupled to a subscriber line, and an enhanced service processing apparatus, the switching center having event detection means for detecting and recording an occurrence of a predetermined event associated with the subscriber line, and call processing means responsive to an attempt to establish or terminate a call connection via the subscriber line to selectively either:
(i) notify the enhanced service processing apparatus of that attempt under a condition of when an occurrence of the predetermined event has been previously recorded by the event detection means, and receiving switching control commands to establish or terminate said call connection, wherein the switching control commands are sent by the enhanced service processing apparatus in response to the notification and that attempt is different than and subsequent to recordation of the occurrence of the predetermined event by the event detection means, or
(ii) establish or terminate said call connection without notifying the enhanced service apparatus under a condition of when an occurrence of the predetermined event has not been previously recorded by the event detection means.

2. A network according to claim 1, wherein the switching center includes processing means including flag means, the processing means having means responsive to notification of said predetermined event to change the state of said flag means and, having means to determine, in dependence on the state of the flag means, whether to notify the enhanced service processing apparatus of an attempt to establish or terminate a call connection via said subscriber line.

3. A network according to claim 2, wherein the processing means includes a plurality of flag means associated with respective predetermined events, the processing means having means to change the state of the associated flag means in response to notification of one of said predetermined events and selection means controlled in dependence on the states of the flag means, together with the flag means state information, the selection means being arranged to select whether to notify the enhanced service processing apparatus of an attempt to establish or terminate a call connection via said subscriber line, and to perform such notification if so selected.

4. A network according to claim 3, wherein the enhanced service processing apparatus has means to control the switching center in dependence on said flag state information.

5. A network according to claim 1, wherein the event detection means comprises a voice mail system, and the predetermined event comprises storing of voice mail for the subscriber of said subscriber line.

6. A network according to claim 1, wherein the event detection means comprises a call charging system, and the predetermined event comprises the call charge for the subscriber of said subscriber line exceeding a threshold value.

7. A method of processing calls in a telephone network comprising the steps of:
a) recording the occurrences of one or more predetermined events at a telephone switching center, said one or more predetermined events being associated with a subscriber line connected to the switching center;
b) detecting attempts to establish or terminate calls via the subscriber line;
c) determining whether a record of the occurrence of one or more of said predetermined events exists at the switching center; and
(i) if a condition is determined that a previous record of the occurrence of one or more of said predetermined events exists at the switching center, then notifying an enhanced service processing apparatus of the attempt, the attempt being different than and subsequent to recordation of the occurrence of one or more of said predetermined events, generating switching control commands at the enhanced service processing apparatus, and communicating said commands to the switching center to control the establishment or termination of said call; or
(ii) if a condition is determined that no previous record of the occurrence of one or more of said predetermined events currently exists at the switching center, then establishing or terminating the call using only the switching functions of the switching center.

8. A method according to claim 7, wherein said one or more predetermined events comprises storing of voice mail.

9. A method according to claim 7, wherein said one or more predetermined events comprises exceeding a threshold value by a cumulative parameter relating to usage of the telephone network.

10. A method according to claim 7, wherein the recording of the occurrence of one or more of the predetermined events takes the form of erasure or cancellation of the recording of another of the predetermined events having occurred previously, such that the enhanced service processing apparatus is not then notified of further call attempts until a further occurrence of the previously-occurring predetermined event.

11. A telephone network comprising:
a telephone switching center coupled to a subscriber line; and
an enhanced service processing apparatus;
the switching center having an event detector for detecting and recording an occurrence of a predetermined event associated with the subscriber line, and a call processor responsive to an attempt to establish or terminate a call connection via the subscriber line to perform selection of one of the following processing operations based on a condition of whether or not the occurrence of the predetermined event associated with the subscriber line has been previously recorded by the event detector:
(i) notify the enhanced service processing apparatus of that attempt under the condition of when the occurrence of the predetermined event has been recorded by the detector, the enhanced service processing apparatus sending switching control commands to the telephone switching center in response to such notification and that attempt being different than and subsequent to recordation of the occurrence of the predetermined event that has been recorded by the event detector; or
(ii) establish or terminate said call connection without such notification under the condition of when the occurrence of the predetermined event has not been previously recorded by the detector.

12. A method of processing calls in a telephone network comprising:
recording the occurrences of one or more predetermined events at a telephone switching center, said events being associated with a subscriber line connected to the switching center;
detecting attempts to establish or terminate calls via the subscriber line;
determining whether a record of the occurrence of one or more of said predetermined events exists at the switching center; and
performing selection of processing based on a condition of whether or not a record of the occurrence of one or more of said predetermined events exists at the switching center such that:

(i) if the condition is determined that a previous record of the occurrence of one or more of said predetermined events exists at the switching center, performing the following processing:

notifying an enhanced service processing apparatus of the attempt, the attempt being different than and subsequent to recordation of the occurrence of one or more of said predetermined events;

generating switching control commands at the enhanced service processing apparatus; and communicating said commands to the switching center to control the establishment or termination of said call; but (ii) if the condition is determined that no previous record of the occurrence of one or more of said predetermined events currently exists at the switching center, performing the following processing:

establishing or terminating the call using only the switching functions of the switching center.

\* \* \* \* \*